No. 810,210. PATENTED JAN. 16, 1906.
B. A. LAWS.
ARTICLE OF CHEWING GUM.
APPLICATION FILED MAY 10, 1905.
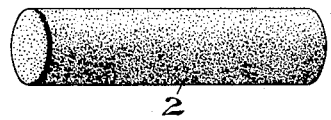
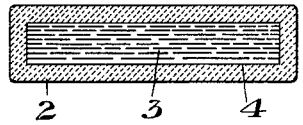
WITNESSES
INVENTOR

UNITED STATES PATENT OFFICE.

BENJAMIN A. LAWS, OF PITTSBURG, PENNSYLVANIA.

ARTICLE OF CHEWING-GUM.

No. 810,210.　　　　Specification of Letters Patent.　　　　Patented Jan. 16, 1906.

Application filed May 10, 1905. Serial No. 259,661.

*To all whom it may concern:*

Be it known that I, BENJAMIN A. LAWS, of Pittsburg, Allegheny county, Pennsylvania, have invented a new and useful Article of Chewing-Gum, of which the following is a full, clear, and exact description, reference being had to the accompanying drawings, forming part of this specification, in which—

Figure 1 is a perspective view of a piece of chewing-gum made in accordance with my invention, and Fig. 2 is a longitudinal section thereof.

Difficulty has been experienced heretofore in the sale of chewing-gum for the reason that the pieces of gum have a tendency to become hard and brittle, in which condition they are no longer agreeable and do not find a ready sale. I have discovered that this difficulty can be avoided by putting up the chewing-gum in small hollow pieces or cakes, the cavities being filled with a liquid or semiliquid, such as a paste or jelly, which will keep the piece of gum in its natural moist and plastic condition for a long time. I prefer to employ as such liquid a fruit syrup, which can be flavored as desired.

In the practice of my invention I make the piece of chewing-gum preferably in the form of a hollow tube, which I then fill with the liquid or semiliquid substance, preferably first coating the interior of the tube with butter or such moisture-resisting substance as will render the absorption of the liquid by the gum very slow. The chewing-gum is made in the usual way, having as its base a gum, such as chicle or spruce gum, insoluble in water, mixed with wax and sugar, &c., the whole being worked into a plastic condition.

In the drawings, 2 represents the hollow piece of chewing-gum, and 3 the liquid or semiliquid filling above mentioned.

4 represents the interior coating of butter, which I prefer to apply.

Within the scope of my invention modifications may be made, since

What I claim is—

1. As a new article of manufacture, a piece of chewing-gum having a base of gum insoluble in water, said piece having a cavity therein charged with a liquid or semiliquid substance, the interior of the cavity being lined with a moisture-resisting material; substantially as described.

2. As a new article of manufacture, a piece of chewing-gum having a base of gum insoluble in water, said piece having a cavity therein charged with a liquid or semiliquid substance, the interior of the cavity being lined with a fatty matter; substantially as described.

In testimony whereof I have hereunto set my hand.

BENJAMIN A. LAWS.

Witnesses:
　JOHN MILLER,
　H. M. CORWIN..